United States Patent [19]

Steele, Jr.

[11] 3,960,321
[45] June 1, 1976

[54] TEMPERATURE RESPONSIVE VALVE

[75] Inventor: Everett T. Steele, Jr., Knoxville, Tenn.

[73] Assignee: Robertshaw Controls Company, Richmond, Va.

[22] Filed: Jan. 20, 1975

[21] Appl. No.: 542,622

[52] U.S. Cl............................. 236/100; 123/117 A; 137/625.27; 137/625.5; 236/86; 251/DIG. 1
[51] Int. Cl.²........................................ G05D 23/12
[58] Field of Search .......... 123/117 A; 236/86, 100, 236/101; 137/625.27, 625.5; 251/332, DIG. 1, 322, 360

[56] References Cited
UNITED STATES PATENTS

| 3,089,509 | 5/1963 | Collins | 137/625.5 X |
| 3,318,333 | 5/1967 | McCollum et al. | 137/625.69 |
| 3,419,041 | 12/1968 | Jennings | 251/332 X |
| 3,731,905 | 5/1973 | Piet | 137/625.27 X |
| 3,738,571 | 6/1973 | Elmer | 236/100 |
| 3,884,266 | 5/1975 | Kondo | 137/625.27 |

Primary Examiner—William E. Wayner
Assistant Examiner—William E. Tapolcai, Jr.
Attorney, Agent, or Firm—O'Brien & Marks

[57] ABSTRACT

A temperature responsive valve having a series of three ports and a specially shaped valve stem and valve seat arrangement wherein the valve stem of the arrangement is connected to a thermostatic power element for controlling open flow intercommunication between the first and second ports or the second and third ports of the series.

4 Claims, 5 Drawing Figures

TEMPERATURE RESPONSIVE VALVE

BACKGROUND OF THE INVENTION

1. Field of the Invention

This invention relates to a valve and in particular to the structure of a temperature responsive valve for pollution control of an internal combustion engine.

2. Description of the Prior Art

In the past it has been conventional for temperature responsive valves to be connected to the coolant system of an internal combustion engine and the various vacuum ports of the valve to be interconnected to the spark advance device, the manifold vacuum and/or the carburetor vacuum of the internal combustion engine for the purpose of controlling the emission of pollutants from the engine while at the same time preventing overheating of the engine coolant system especially when the engine is being operated at an idle speed.

U.S. Pat. Nos. 3,436,017; 3,540,422; 3,738,571 and 3,750,639 are representative of the prior art in illustrating the variety of temperature responsive valves.

One of the problems associated with the prior art temperature responsive valves is that even though the prior art temperature responsive valves as manufactured were of relatively simple construction they were susceptible, after repeated and prolonged use, of leakage and therefore would eventually perform non-satisfactorily in minimizing pollutants emitted from an internal combustion engine operating at an idle position.

SUMMARY OF THE INVENTION

The present invention is summarized in a temperature responsive valve that includes a valve body having open and closed ends, the interior surface means of the valve body defining a chamber between its ends in open communication with the open end of the valve body, a series of three spaced ports connected to said valve body between its ends, each one of the ports of said series being in communication through the chamber of said valve body with the other ports of said series, a thermostatic power element secured to the open end of said valve body and having more than one position at predetermined temperature levels for controlling the operation of said valve, a first valve seat means having an opening and being affixed to certain surface means of the interior surface means of said valve body adjacent its closed end and in the chamber thereof, a second valve seat means having an opening and being affixed to other surface means of the interior surface means of said valve body in the chamber thereof, said second valve seat means being interposed between and spaced from said first valve seat means and the open end of said valve body, a valve stem means one end of which is connected to said thermostatic power element and the free end of which protrudes through the opening of said second valve seat means and into the opening of said first valve seat means, the outer peripheral surface portions of said valve stem means at its free end including first and second annular groove means spaced from each other and interposed between and spaced from said first and second valve seat means, first and second rings of resilient material disposed in said first and second groove means and being arranged to extend in a direction radially outward of both the outer peripheral surface portions of said valve stem means and the outer radial extent of either one of the openings of said first and second valve seat means, and spring means interposed between said valve stem means and said second valve seat means for urging said valve stem means in a direction towards the open end of said valve body in order to effect positive sealing engagement between said second ring and said second valve seat means while at the same time to effect disengagement between said first ring and said first valve seat means thereby establishing open flow intercommunication between one and another ports of said series when said power element is in one position at a predetermined temperature level for controlling the operation of said valve.

An object of the present invention is to provide a temperature responsive valve of simplified construction having a series of three spaced vacuum ports.

Another object of the present invention is to have a temperature responsive valve with a double o-ring valve stem and spaced valve seats for effecting positive sealing engagement.

The present invention has another object in which the temperature responsive valve has bevelled surfaces on both the valve stem and spaced valve seats for facilitating communication between vacuum ports of the temperature responsive valve.

DESCRIPTION OF THE PREFERRED EMBODIMENT

Figure 1:
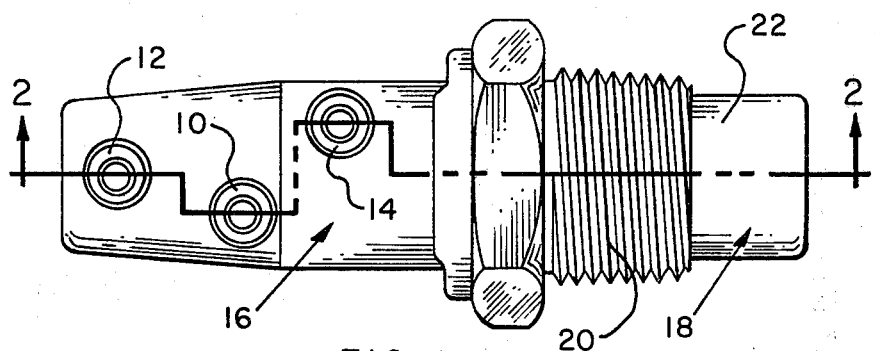
FIG. 1 is a side elevational view of a temperature responsive valve embodying the present invention.

The present invention is embodied in a temperature responsive valve illustrated in FIG. 1 as including a series of three spaced and relatively offset ports 10, 12 and 14 integrally formed as part of a die cast metal valve body 16. Port 10 is normally connected to the spark advance device (not shown) of an internal combustion engine; port 12 is preferably connected to the carburetor of the internal combustion engine; and port 14 is normally connected to the manifold thereof. The open end of valve body 16 is closed off by a thermostatic power element 18 having a threaded fitting 20 for effecting connection of the temperature responsive valve to a certain part of the internal combustion engine so that the capsuled end 22 of element 18 is in direct contact with the coolant of the coolant system of an internal combustion engine.

Figure 2:
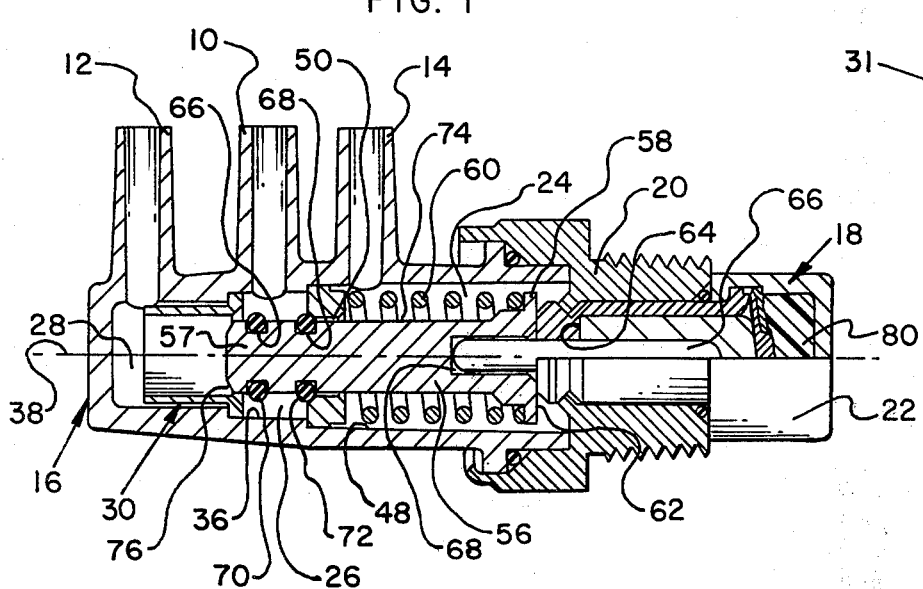
FIG. 2 is a view in longitudinal section as taken along line 2—2 of FIG. 1.
Figure 3:
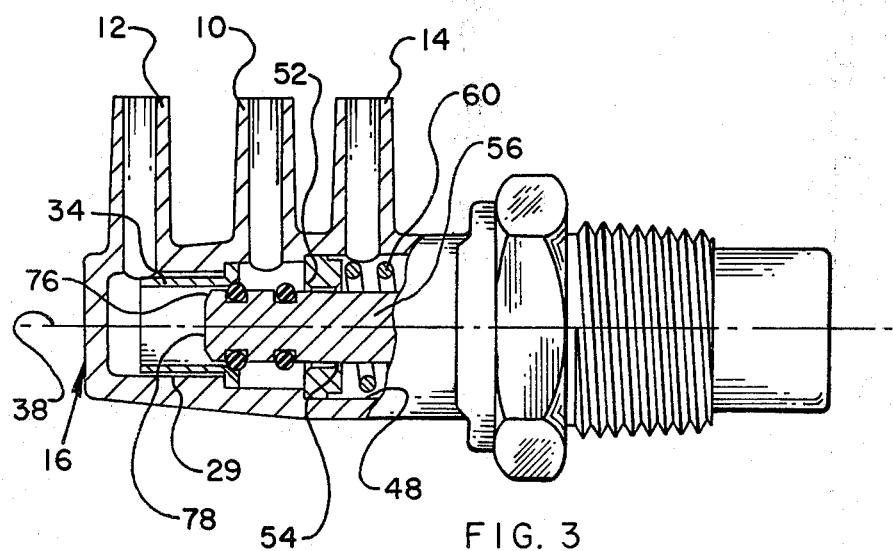
FIG. 3 is a view similar to FIG. 2 but with parts added in solid lines and illustrates the temperature responsive valve in another operative position.

As illustrated in FIGS. 2–3 the interior surface of valve body 16 between its open and closed ends has a chamber made up of a plurality of three chambers 24, 26 and 28 of progressively smaller size in cross section and in a direction from the open end to the closed end of valve body 16. The plurality of chambers 24, 26 and 28 are in open communication with the open end of valve body 16 and with the series of three ports 10, 12 and 14. The interior surface of valve body 16 that defines the outer radial limits of chamber 28 has a frusto-conical surface 29 that extends in a divergent and outward direction towards the open end of valve body 16.

A first valve seat 30 includes a metal sleeve of cylindrical shape having an opening 31 and a flanged end 32. A non-flanged end 34 of first valve seat 30 has an outside diameter somewhat smaller than the internal diameter at the narrow end of frusto-conical surface 29. The outer annular surface 35 at the flanged end 32 of valve seat 30 has an outside diameter slightly smaller than the internal diameter of the interior surface 36 of the valve body 16 that defines the outer radial limits of chamber 26. By reason of the difference between the diameters of interior surface 29 and the nonflanged end of valve seat 30 and between the diameter of interior surface 36 and the outer annular surface 35 of valve seat 30, valve seat 30 may be inserted through the open end of valve body 16 and forcefully driven towards the closed end of the valve seat until the shoulder at the flanged end 32 of seat 30 is seated against the shoulder between interior surfaces 29 and 36 of valve body 16 in the manner illustrated in FIGS. 2–3. At this time first valve seat 30 is positively affixed to valve body 16 and is disposed in concentric relation about the longitudinal axis 38 of valve body 16.

Figure 4:
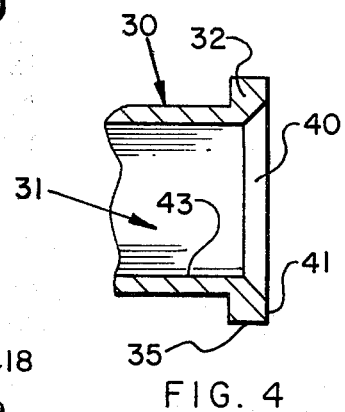
FIG. 4 is an enlarged partial sectional view of a valve seat as shown in FIGS. 2–3.

First valve seat 30 includes an annular bevelled surface 40 interposed between the outer end face 41 and the interior surface 43 of the seat 30 as depicted in FIGS. 2–4. Annular surface 40 faces in a direction toward the open end of valve body 16.

Figure 5:
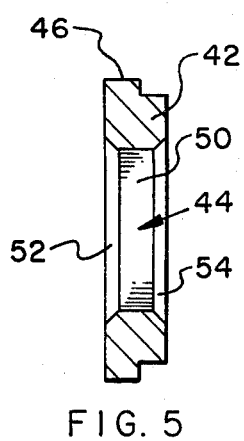
FIG. 5 is an enlarged sectional view of another valve seat illustrated in FIGS. 2–3.

Second valve seat 42 has a disc-shaped configuration and an opening 44. Second valve seat 42 has an outermost annular surface 46, as indicated in FIGS. 2–3 and 5, that has an outside diameter slightly smaller than the inside diameter of the interior surface 48 of valve body 16 which defines the outer radial limits of chamber 24. Second valve seat 42 is inserted through the open end of valve body 16 and is forcefully driven towards the closed end of valve body 16 until the inner end face of seat 42 is seated against the shoulder between interior surfaces 36 and 48 of valve body 16 in the manner shown in FIGS. 2–3. At this time second valve seat 42 is positively affixed to valve body 16, is disposed in concentric relation about the longitudinal axis 38 thereof, and is disposed in spaced relation to first valve seat 30.

Second valve seat 42 includes an inner annular surface 50 and opposed annular bevelled surfaces 52 and 54 connected to the opposite ends of annular surface 50 as illustrated in FIGS. 2–3 and 5. Annular beveled surface 52 faces in a direction towards the closed end of valve body 16 and annular bevelled surface 54 faces in a direction towards the open end thereof.

A valve stem 56 is inserted through the open end of valve body 16 in the chamber thereof until its free end 57 protrudes through the opening 44 of second valve seat 42 and extends into the opening 31 of first valve seat 30 in the manner shown in FIGS. 2–3. The opposite end 58 of valve stem 56 is flanged and a coil spring 60 is interposed between and interconnected to second valve seat 42 and the flanged end 58 of valve stem 56 as depicted in FIGS. 2–3. Valve stem 56 between the free and flanged ends 57 and 58 has a diameter less than the diameter of either one of the openings 31 and 44 of first and second valve seats 30 & 42. Coil spring 60 urges valve stem 56 in a direction towards the open end of valve body 16 such that the end face 62 of valve stem 56 is seated against the stop surface 64 of thermostatic power element 18 in the manner indicated in FIG. 2. The left hand end of an actuating rod-type piston 66 of thermostatic power element 18 is inserted in the bore 68 at the flanged end 58 of valve stem 56 as illustrated in FIG. 2. Coil spring 60, actuating piston 66 of power element 18 and stop surface 64 thereof all cooperate to support valve stem 56 in concentric relation about the longitudinal axis 38 of valve body 16 throughout normal use of the temperature responsive valve of the present invention.

The outer peripheral surface portions 74 of valve stem 56 at its free end 57 include first and second annular grooves 66 and 68 interposed between and spaced from the first and second valve seats 30 and 42 of the temperature responsive valve. First and second o-rings 70 and 72 of resilient material are disposed in the first and second annular grooves 66 and 68 as shown in FIGS. 2–3. The outer portions of first or second o-ring 70 and 72 extend radially outward of both the outer peripheral surface portions 74 of valve stem 56 and either one of the openings 31 and 44 of first and second valve seats 30 and 42. The free end 57 of valve stem 56 includes an annular beveled surface 76 that is spaced from first annular groove 66 and faces in a direction towards the closed end of valve body 16 as shown in FIGS. 2–3.

When thermostatic power element 18 is in one position at a relatively low temperature level, such as a normal operating temperature level of an internal combustion engine, for controlling the operation of the temperature responsive valve, the wax 80 of power element 18 is in a non-melted and non-expansive condition. Further, coil spring 60 urges the end face 62 of valve stem 56 into seating engagement against the stop surface 64 of thermostatic power element 18 thereby forcing second o-ring 72 into positive sealing engagement about the beveled surface 52 of second valve seat 42 thereby closing off flow intercommunication between spaced ports 10 and 14 of valve body 16. Meanwhile, flow intercommunication is established between spaced ports 10 and 12 of valve body 16 through the passageway between first valve seat 30 and the free end 57 of valve stem 56 since first o-ring 70 is spaced and disengaged from beveled surface 40 of first valve seat 30 as shown in FIG. 2. The opposed annular beveled surfaces 40 and 76 of first valve seat 30 and valve stem 56 facilitate the flow intercommunication between spaced ports 10 and 12 of valve body 16 when thermostatic power element 18 is in the one position as illustrated in FIG. 2.

Upon thermostatic power element 18 being in another position at a higher temperature level, such as an overheated condition of an internal combustion engine, for controlling the operation of the temperature responsive valve, the wax 80 of power element of 18 becomes melted and expands. Further the expanded wax 80 of power element 18 forcefully moves piston 66 to the left as viewed in FIGS. 2–3 thereby overcoming the bias of coil spring 60. This left advancement of valve stem 56 as viewed in FIG. 3 continues until outer portions of first o-ring 70 are disposed in positive sealing engagement about the annular surface 40 of first valve seat 30 thereby closing off flow intercommunication between spaced ports 10 and 12 of valve body 16. At the same time second o-ring 72 is spaced and disengaged from bevelled surface 52 of first valve seat 42 thereby establishing flow intercommunication between spaced ports 10 and 14 of valve body 16 through the passage way between outer surface portions 74 of valve stem 56 and surfaces 50, 52 and 54 of second valve seat 42 as indicated in FIG. 3. Beveled surfaces 52 and 54 of second valve seat 42 facilitate flow intercommunication between spaced ports 10 and 14 of valve body 16 when power element 18 is in the other position at the higher temperature level.

The outer portions of first and second o-rings 70 and 72 are capable of repeated positive sealing engagement, without excessive wear-and-tear, with their associated beveled-surfaces 40 and 52 of first and second valve seats 30 and 42. Consequently, first and second o-rings 70 and 72 may be used for an extended period of time without requiring repair or replacement of the temperature responsive valve of the present invention. Moreover, bevelled surfaces 54 and 52 of second valve seat 30 facilitate compression and release of first and second o-rings 70 and 72 without injury to these o-rings 70 and 72 when the free end 57 of valve stem 56 is inserted through the opening 44 of second valve seat 42 during the manufacture of the temperature responsive valve.

Since the present invention is subject to many modifications, variations and changes in detail, it is intended that all matter contained in the foregoing description or shown in the accompanying drawings shall be interpreted as illustrative and not in a limiting sense.

What is claimed is:

1. A temperature responsive valve comprising:
   a valve body having open and closed ends, the interior surface means of the valve body defining a chamber between its ends in open communication with the open end of the valve body,
   a series of three spaced ports connected to said valve body between its ends, each one of said ports of said series being in communication through the chamber of said valve body with the other ports of said series,
   a thermostatic power element secured to the open end of said valve body and having more than one position at predetermined temperature levels for controlling the operation of said valve,
   a first valve seat means having an opening and being affixed to certain surface means of the interior surface means of said valve body adjacent its closed end and in the chamber thereof,
   a second valve seat means having an opening and being affixed to other surface means of the interior surface means of said valve body in the chamber thereof, said second valve seat means being interposed between and spaced from said first valve seat means and the open end of said valve body,
   a valve stem means one end of which is connected to said thermostatic power element and the free end of which protrudes through the opening of said second valve seat means and into the opening of said first valve seat means,
   the outer peripheral surface portions of said valve stem means at its free end including first and second annular groove means spaced from each other and interposed between and spaced from said first and second valve seat means,
   first and second rings of resilient material disposed in said first and second groove means and being arranged to extend in a direction radially outward of both the outer peripheral surface portions of said valve stem means and the outer radial extent of either one of the openings of said first and second valve means,
   one end of said first valve seat means having an annular beveled surface facing in a direction towards the open end of said valve body, and beveled surface being sealingly engaged by said first ring when said power element is in another position at another predetermined temperature level for controlling the operation of said valve, and
   spring means interposed between said valve stem means and said second valve seat means for urging said valve stem means in a direction towards the open end of said valve body in order to effect positive sealing engagement between said second ring and said second valve seat means while at the same time to effect disengagement between said first ring and said first valve seat means thereby establishing open flow intercommunication between one and another ports of said series when said power element is in one position at a predetermined temperature level for controlling the operation of said valve.

2. A temperature responsive valve comprising:
   a valve body having open and closed ends, the interior surface means of the valve body defining a chamber between its ends in open communication with the open end of the valve body,
   a series of three spaced ports connected to said valve body between its ends, each one of said ports of said series being in communication through the chamber of said valve body with the other ports of said series,
   a thermostatic power element secured to the open end of said valve body and having more than one position at predetermined temperature levels for controlling the operation of said valve,
   a first valve seat means having an opening and being affixed to certain surface means of the interior surface means of said valve body adjacent its closed end and in the chamber thereof,
   a second valve seat means having an opening and being affixed to other surface means of the interior surface means of said valve body in the chamber thereof, said second valve seat means being interposed between and spaced from said first valve seat means and the open end of said valve body,
   a valve stem means one end of which is connected to said thermostatic power element and the free end of which protrudes through the opening of said second valve seat means and into the opening of said first valve seat means,
   the outer peripheral surface portions of said valve stem means at its free end including first and second annular groove means spaced from each other and interposed between and spaced from said first and second valve seat means,
   first and second rings of resilient material disposed in said first and second groove means and being arranged to extend in a direction radially outward of both the outer peripheral surface portions of said valve stem means and the outer radial extend of either one of the openings of said first and second valve seat means,
   said second valve seat means having an annular surface surrounding the opening thereof, first and second annular beveled surfaces connected to the opposed ends of said annular surface, said annular surface together with said first and second annular beveled surfaces for facilitating flow intercommunication between the one and third ports of said series when said power element is in another position at another predetermined temperature level for controlling the operation of said valve, and spring means interposed between said valve stem means and said second valve seat means for urging said valve stem means in a direction towards the open end of said valve body in order to effect positive sealing engagement between said second ring and said second valve seat means while at the same time to effect disengagement between said first ring and said first valve seat means thereby establishing open flow intercommunication between one and another ports of said series when said power element is in one position at a predetermined temperature level for controlling the operation of said valve.

3. A temperature responsive valve comprising:

a valve body having open and closed ends, the interior surface means of the valve body defining a chamber between its ends in open communication with the open end of the valve body, a series of three spaced ports connected to said valve body between its ends, each one of said ports of said series being in communication through the chamber of said valve body with the other ports of said series, a thermostatic power element secured to the open end of said valve body and having more than one position at predetermined temperature levels for controlling the operation of said valve, a first valve seat means having an opening and being affixed to certain surface means of the interior surface means of said valve body adjacent its closed end and in the chamber thereof, a second valve seat means having an opening and being affixed to other surface means of the interior surface means fo said valve body in the chamber thereof, said second valve seat means being interposed between and spaced from said first valve seat means and the open end of said valve body, a valve stem means one end of which is connected to said thermostatic power element and the free end of which protrudes through the opening of said second valve seat means and into the opening of said first valve seat means, the outer peripheral surface portions of said valve stem means at its free end including first and second annular groove means spaced from each other and interposed between and spaced from said first and second valve seat means, first and second rings of resilient material disposed in said first and second groove means and being arranged to extend in a direction radially outward of both the outer peripheral surface portions of said valve stem means and the outer radial extend of either one of the openings of said first and second valve seat means, wherein said first valve seat means has an annular beveled surface surrounding the opening, wherein the free end of said valve stem means has an annular beveled surface spaced from said first groove means in a direction towards the closed end of said valve body, and wherein the annular beveled surface of said first valve seat means and the annular beveled surface of said valve stem means cooperate to facilitate flow intercommunication between the one and the other of said ports of said series when said power element is in the one position, and spring means interposed between said valve stem means and said second valve seat means for urging said valve stem means in a direction towards the open end of said valve body in order to effect positive sealing engagement between said second ring and said second valve seat means while at the same time to effect disengagement between said first ring and said first valve seat means thereby establishing open flow intercommunication between one and another ports of said series when said power element is in one position at a predetermined temperature level for controlling the operation of said valve.

4. A temperature responsive valve comprising:

a valve body having open and closed ends, the interior surface means of the valve body defining a chamber between its ends in open communication with the open end of the valve body, a series of three spaced ports connected to said valve body between its ends, each one of said ports of said series being in communication through the chamber of said valve body with the other ports of said series, a thermostatic power element secured to the open end of said valve body and having more than one position at predetermined temperature levels for controlling the operation of said valve, a first valve seat means having an opening and being affixed to certain surface means of the interior surface means of said valve body adjacent its closed end and in the chamber thereof, a second valve seat means having an opening and being affixed to other surface means of the interior surface means of said valve body in the chamber thereof, said second valve seat means being interposed between and spaced from said first valve seat means and the open end of said valve body, a valve stem means one end of which is connected to said thermostatic power element and the free end of which protrudes through the opening of said second valve seat means and into the opening of said first valve seat means, the outer peripheral surface portions of said valve stem means at its free end including first and second annular groove means spaced from each other and interposed between and spaced from said first and second valve seat means, first and second rings of resilient material disposed in said first and second groove means and being arranged to extend in a direction radially outward of both the outer peripheral surface portions of said valve stem means and the outer radial extent of either one of the openings of said first and second valve seat means, said first valve seat means being a sleeve of cylindrical shape having opposed ends, and wherein the opposed ends of said sleeve are secured to certain spaced interior surface means of the interior surface means of said valve body adjacent its closed end thereby disposing said first valve seat means in alignment with the free end of said valve stem means, and spring means interposed between said valve stem means and said second valve seat means for urging said valve stem means in a direction towards the open end of said valve body in order to effect positive sealing engagement between said second ring and said second valve seat means while at the same time to effect disengagement between said first ring and said first valve seat means thereby establishing open flow intercommunication between one and another ports of said series when said power element is in one position at a predetermined temperature level for controlling the operation of said valve.

\* \* \* \* \*